(12) United States Patent
Hedlund et al.

(10) Patent No.: US 6,616,785 B2
(45) Date of Patent: Sep. 9, 2003

(54) FILTER FORMING AND JOINING METHOD

(75) Inventors: Timothy R. Hedlund, Shoreview, MN (US); Wilmer E. Blietz, New Richmond, WI (US); Kevin D. Strand, Stillwater, MN (US); James R. Sim, White Bear Lake, MN (US); Gregory V. Spaulding, Golden Valley, MN (US); Theodore W. Jagger, White Bear Lake, MN (US); Michael S. Perreault, Hugo, MN (US)

(73) Assignee: Midmac Systems, Inc., St. Paul, MN (US)

( * ) Notice: Subject to any disclaimer, the term of this patent is extended or adjusted under 35 U.S.C. 154(b) by 0 days.

(21) Appl. No.: 09/812,155

(22) Filed: Mar. 19, 2001

(65) Prior Publication Data

US 2003/0131925 A1 Jul. 17, 2003

Related U.S. Application Data

(62) Division of application No. 09/244,472, filed on Feb. 4, 1999, now Pat. No. 6,230,777.

(51) Int. Cl.[7] .............................................. B29C 53/38
(52) U.S. Cl. ...................................... 156/218; 156/474
(58) Field of Search ................................ 156/218, 219, 156/220, 209, 582, 474, 203, 217; 493/941; 29/902

(56) References Cited

U.S. PATENT DOCUMENTS

| | | | | |
|---|---|---|---|---|
| 3,948,712 A | * | 4/1976 | Stannard | 156/218 |
| 4,626,307 A | * | 12/1986 | Cherkas et al. | 156/218 |
| 4,948,445 A | * | 8/1990 | Hees | 156/196 |
| 5,114,511 A | * | 5/1992 | Goodfellow | 156/111 |

* cited by examiner

*Primary Examiner*—Michael W. Ball
*Assistant Examiner*—Gladys Corcoran
(74) *Attorney, Agent, or Firm*—Faegre & Benson, LLP

(57) ABSTRACT

A filter forming and joining method of the present invention automatically forms a succession of metal-free cylindrical filter elements from a pleat block of pleated filter material, each pleat block having a first end pleat at a first end of the pleat block and a second end pleat at a second end of the pleat block. The method includes using a pleat block isolator for isolating successive individual pleat blocks from other pleat blocks in a succession of pleat blocks in preparation for filter formation, a filter former for manipulating each isolated pleat block along a forming path into a hollow cylinder shape, the hollow cylinder-shaped isolated pleat block having a first end pleat and a second end pleat positioned adjacent each other, and a filter joiner for bonding together the adjacent first and second end pleats of each hollow cylinder-shaped isolated pleat block producing a metal-free cylindrical filter element.

19 Claims, 17 Drawing Sheets

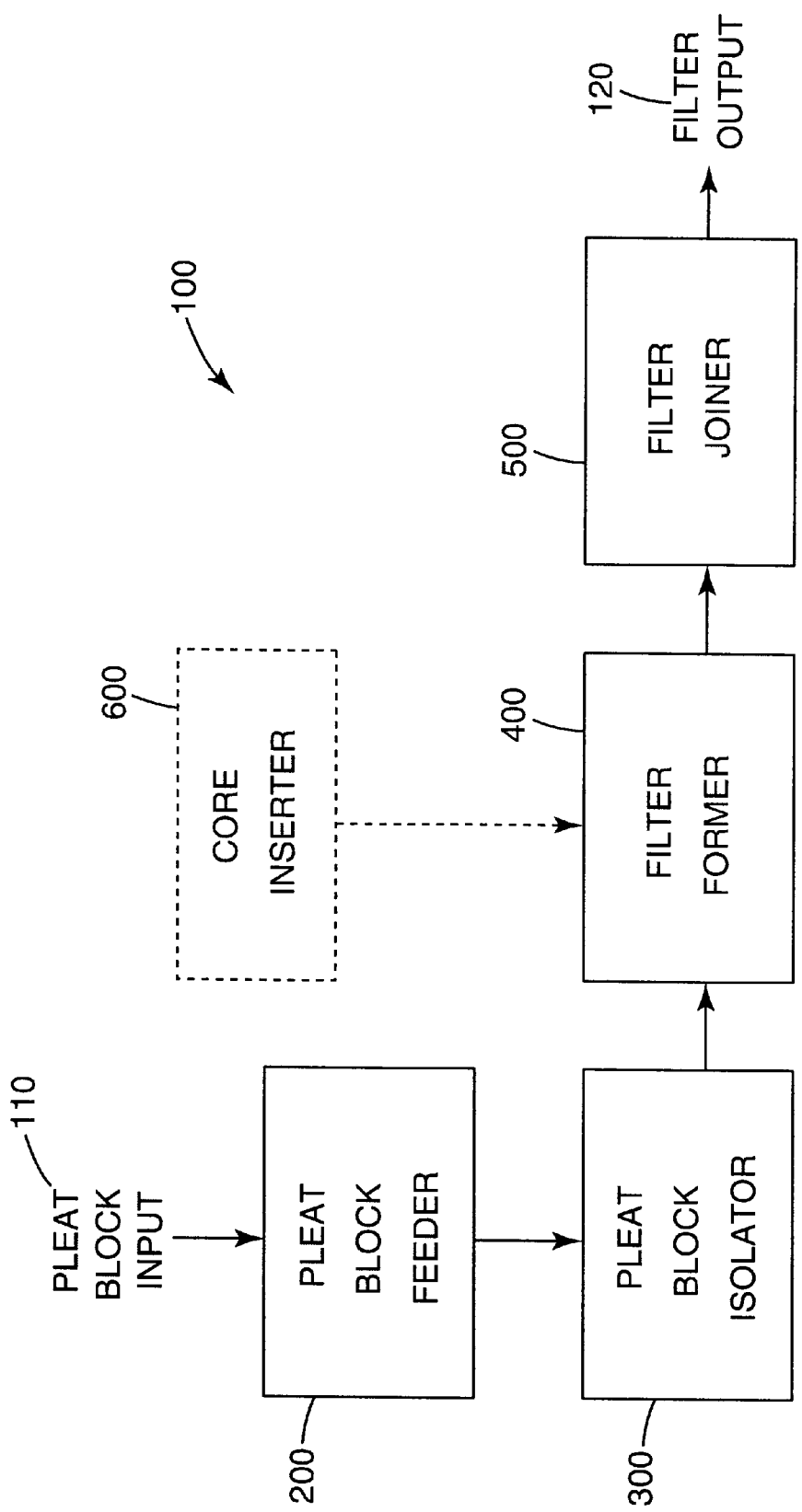

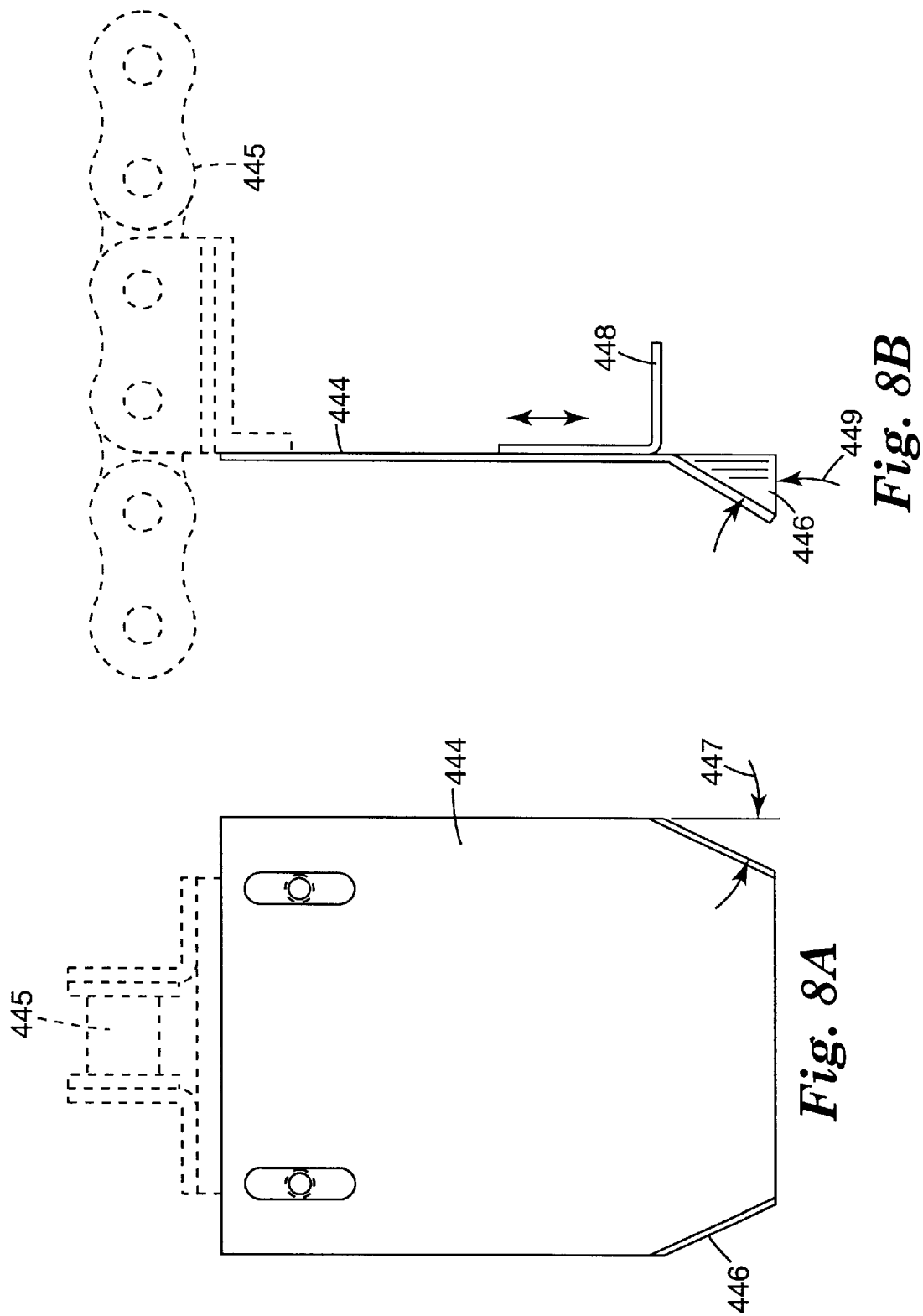

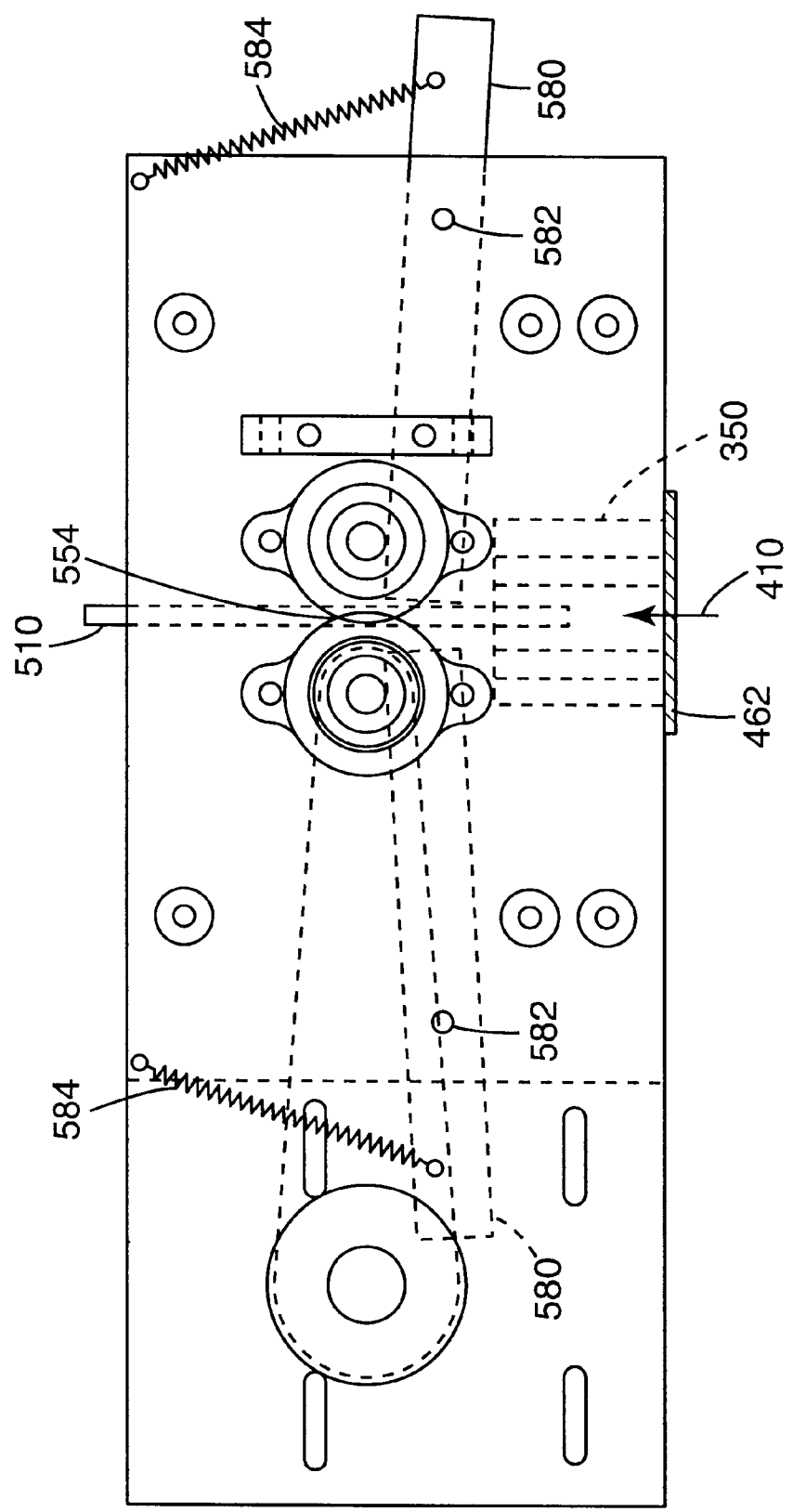

FILTER FORMING AND JOINING METHOD

This is a divisional of application Ser. No. 09/244,472, filed Feb. 4, 1999, now U.S. Pat. No. 6,230,777, entitled FILTER FORMING AND JOINING APPARATUS.

FIELD OF THE INVENTION

This invention relates to apparatus and methods for forming metal-free filter elements from pleated blocks of filter material.

BACKGROUND OF THE INVENTION

Canister filters, such as those for example used as automobile oil filters, water filter, or air filters, have historically consisted of pleated filter material formed into a cylinder shape around a perforated center core and placed in an enclosed canister. The filter material used in such canister filters is primarily a treated paper-type media that is unwound from large rolls, pleated, and slit to width. The media may also be cured depending on the type of treatment used. The pleated media strips are then count cut into blocks having a specified number of pleats per block.

Once in blocks of the correct size and pleat number, the pleated blocks are formed into a hollow cylinder shape with the ends thereof secured in some manner to hold the cylinder shape. A center core may also be inserted into the hollow center of the cylinder, if desired. The pleated filter material has traditionally been held in its cylindrical configuration by one or more metal clips, or by lapping the outermost pleats or by tying a string around the cylinder to hold it in shape during the next assembly procedure. This cylindrical assembly can then be capped on one or both ends by circular ring shaped end caps. This pleated filter sub-assembly may then be inserted in a canister and secured by another circular ring shaped end cap. The center core, clips, end caps and canisters have usually been formed from metallic material that may or may not be recyclable when the filter is disposed of.

Formation of the hollow cylinder-shaped filter element from the pleated blocks of filter material has been achieved by many means, including manual, semi-automatic and automatic formation. The manual and semiautomatic methods are slow and costly, and even the automatic systems available to date have inefficiencies and other drawbacks.

In addition, the current automatic systems available are designed to produce filters having metal components. However, with the current emphasis on environmental and waste disposal concerns both in the U.S. and internationally, the trend in filter formation is toward metal-free filter assemblies. New car engines, especially foreign models, are being manufactured with permanent core substitutes within the engine at the filter mounting location, thereby eliminating the need for metal center cores in the filter assemblies. New methods for filter joining are also being pursued to eliminate the need for metal clips or metal end caps. Reusable or recyclable metal canisters are also being developed wherein a used filter assembly may be separated into the metallic canister and end caps, and the non-metallic disposable pleated filter element. Until now automated equipment capable of cost effective and efficient production of such metal-free pleated filter elements has not been available.

SUMMARY OF THE INVENTION

A filter forming and joining apparatus of the present invention automatically forms a succession of metal-free cylindrical filter elements in a cost effective and efficient manner. Each metal-free cylindrical filter element is produced from a pleat block of pleated filter material, each pleat block having a first end pleat at a first end of the pleat block and a second end pleat at a second end of the pleat block. The apparatus includes a pleat block isolator for isolating successive individual pleat blocks from other pleat blocks in a succession of pleat blocks in preparation for filter formation. Also included is a filter former that manipulates each isolated pleat block along a forming path into a hollow cylinder shape, the hollow cylinder-shaped isolated pleat block having a first end pleat and a second end pleat positioned adjacent each other. The apparatus further includes a filter joiner that bonds together the adjacent first and second end pleats of each hollow cylinder-shaped isolated pleat block producing a metal-free cylindrical filter element.

BRIEF DESCRIPTION OF THE DRAWINGS

FIG. 1 is a schematic illustrating the overall process and machine elements of a filter forming and joining apparatus of the present invention.

FIG. 8A is an end view of an upper convex or paddle.

FIG. 8B is a side view of the paddle shown in FIG. 8A.

FIG. 15A is a top view of the filter joiner.

DETAILED DESCRIPTION

Figure 2A:
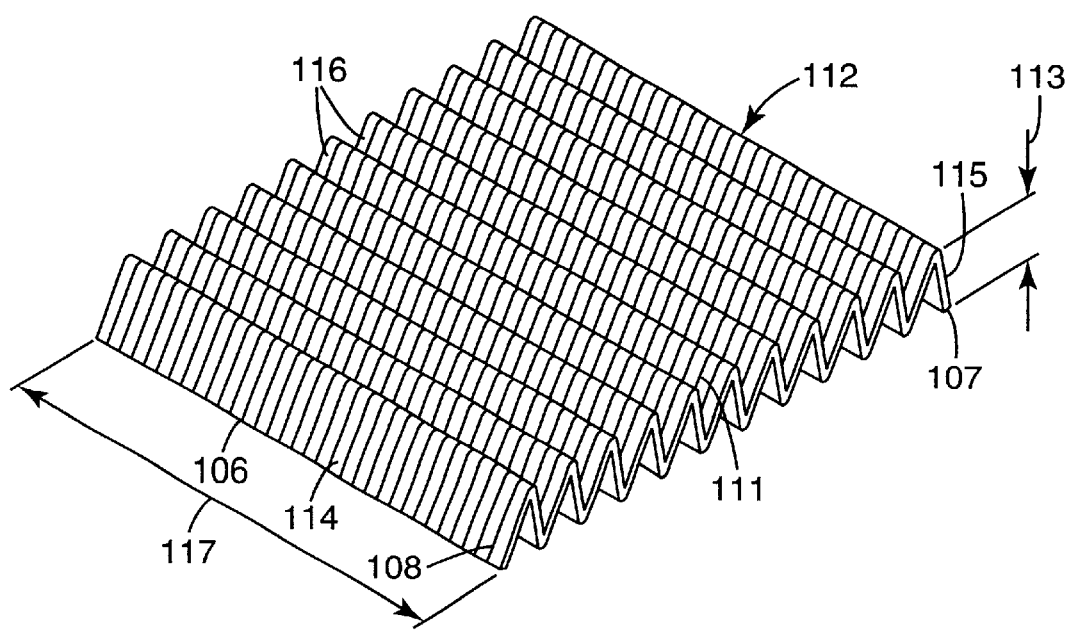
FIG. 2A is a perspective view of a pleat block in a semi-expanded form.

With reference to the attached Figures, it is to be understood that like components are labeled with like numerals throughout the several Figures. FIG. 1 is a schematic illustrating a filter forming and joining apparatus 100 made up of a number of components, including a pleat block feeder 200, a pleat block isolator 300, a filter former 400 and a filter joiner 500. Also included is an optional core inserter 600. These components will be discussed in detail below. The input 110 to the apparatus is pleat blocks 112, shown in FIGS. 2A and 2B. These pleat blocks 112 are automatically conveyed through the components of the apparatus 100. During their conveyance through the apparatus 100 they are formed and then joined to produce filter elements 122, shown in FIG. 3, as the output 120 of the apparatus 100.

Figure 2B:
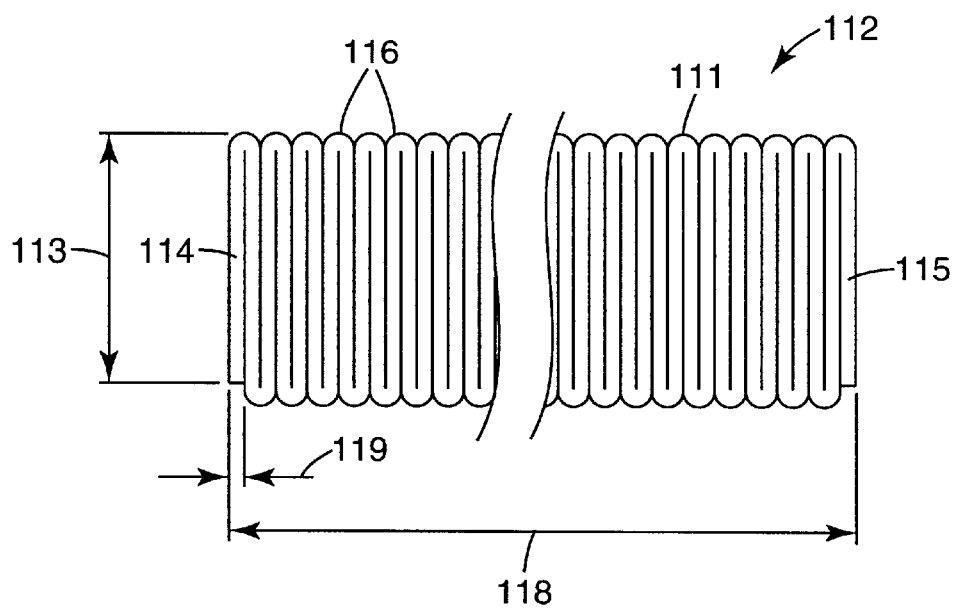
FIG. 2B is an end view of a pleat block in a compressed form.

A pleat block 112 is made from filter material 111 that has been pleated, slit to a width 117, and then cut to a specific number of pleats 116. The filter material 111 is primarily treated paper-type media, such as, for example, blown cellulose, however other filter media that is pleatable is contemplated and within the scope of the present invention. Many filter materials 111 will include corrugations 108 that run perpendicular to the pleats 116. In addition, the filter material 111 may be porous or fibrous resulting in higher coefficients of friction at the surface. The treated media may be cured prior to filter forming, may be cured after filter forming, or may not need to be cured. Each pleat block 112 has a pleat height 113, and a compressed width 118 that is measured while the pleats 116 are squeezed together until they touch, as shown in FIG. 2B. This compressed width 118 is a function of the filter material thickness 119 and the number of pleats 116 within the pleat block 112. The type, thickness and pleating of a specific filter material 111 will also determine the spring characteristics of the pleat block 112 during relaxation, as shown in FIG. 2A. These spring characteristics affect the handling of the pleat block 112 by the apparatus 100. The type of filter material 111, pleat height 113 and pleat block size will vary depending on the intended use of the filter element 122. It is to be understood that the spring characteristics of pleat blocks 112 include, but are not necessarily limited to, the propensity of the pleat block 112 to buckle or move out of column as the block 112 is compressed.

Each pleat block 112 also has a first end pleat 114 and a second end pleat 115 located on opposite sides of the pleat block 112. The cut ends 106, 107 of these end pleats 114, 115, respectively, may both point down (as shown in FIGS. 2A and 2B), or both point up, or one may point up and the other point down. Preferably, both cut ends 106, 107 point in the same direction. The pleat height 113, slit width 117 and compressed width 118 for a type of filter element 122 may vary within acceptable tolerances for the apparatus 100. Preferably, each lot of pleat blocks 112 formed into filter elements 122 will consist of the same general type and size of pleat blocks 112.

Figure 3:
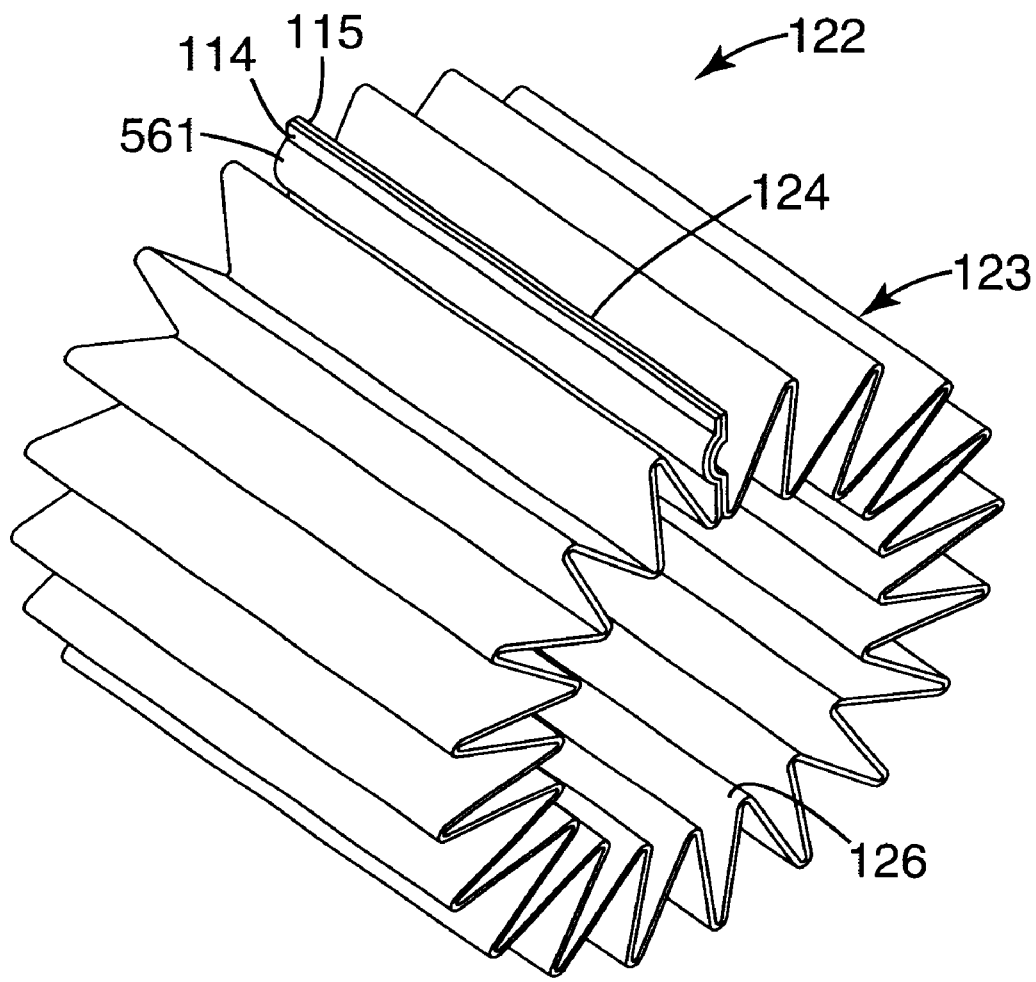
FIG. 3 is a perspective view of a filter element formed from a pleat block and joined at the outermost pleats.

The filter element 122 that is output by the apparatus 100, shown in FIG. 3, has a hollow cylinder shape formed by bringing together the first end pleat 114 and the second end pleat 115 of a pleat block 112. The central hollow region 126 formed by the reconfigured pleat block 123 will vary in size based on the dimensions and possibly the spring characteristics of the original pleat block 112. A metal-free filter element 122 is formed by bonding together the now adjacent end pleats 114, 115 at the joint 124 using adhesive, or other non-metallic methods, strong enough to withstand the internal pressures that will develop within the filter element 122 during use. In addition, the joint 124 may be embossed to form a crease 561 to enhance the strength of the joint 124. The resulting hollow cylinder-shaped metal-free filter element 122 is then ready for further processing, such as curing, addition of end caps, and/or insertion into a canister.

Figure 4:
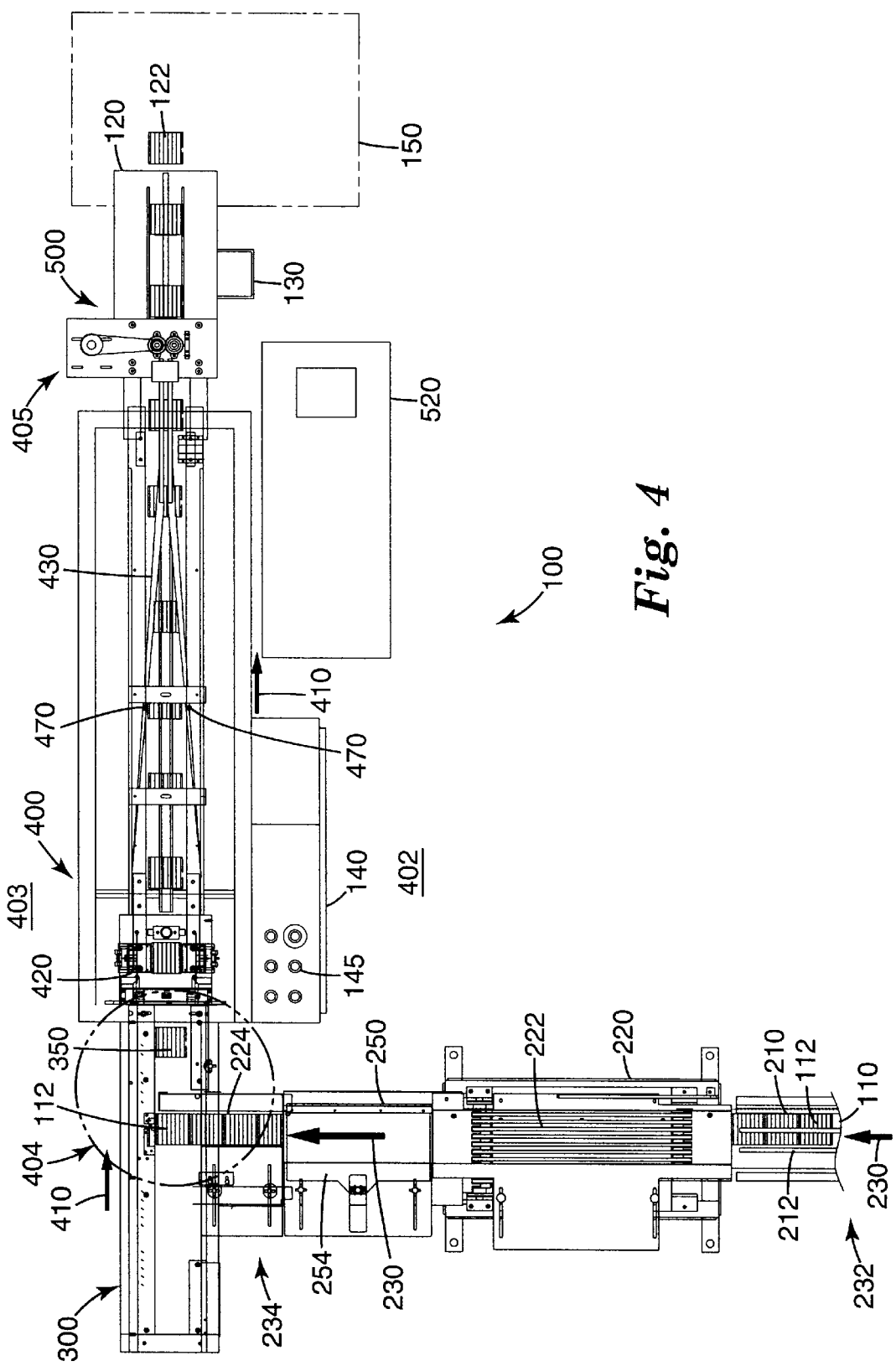
FIG. 4 is a plan view of a filter forming and joining apparatus of the present invention.
Figure 5:
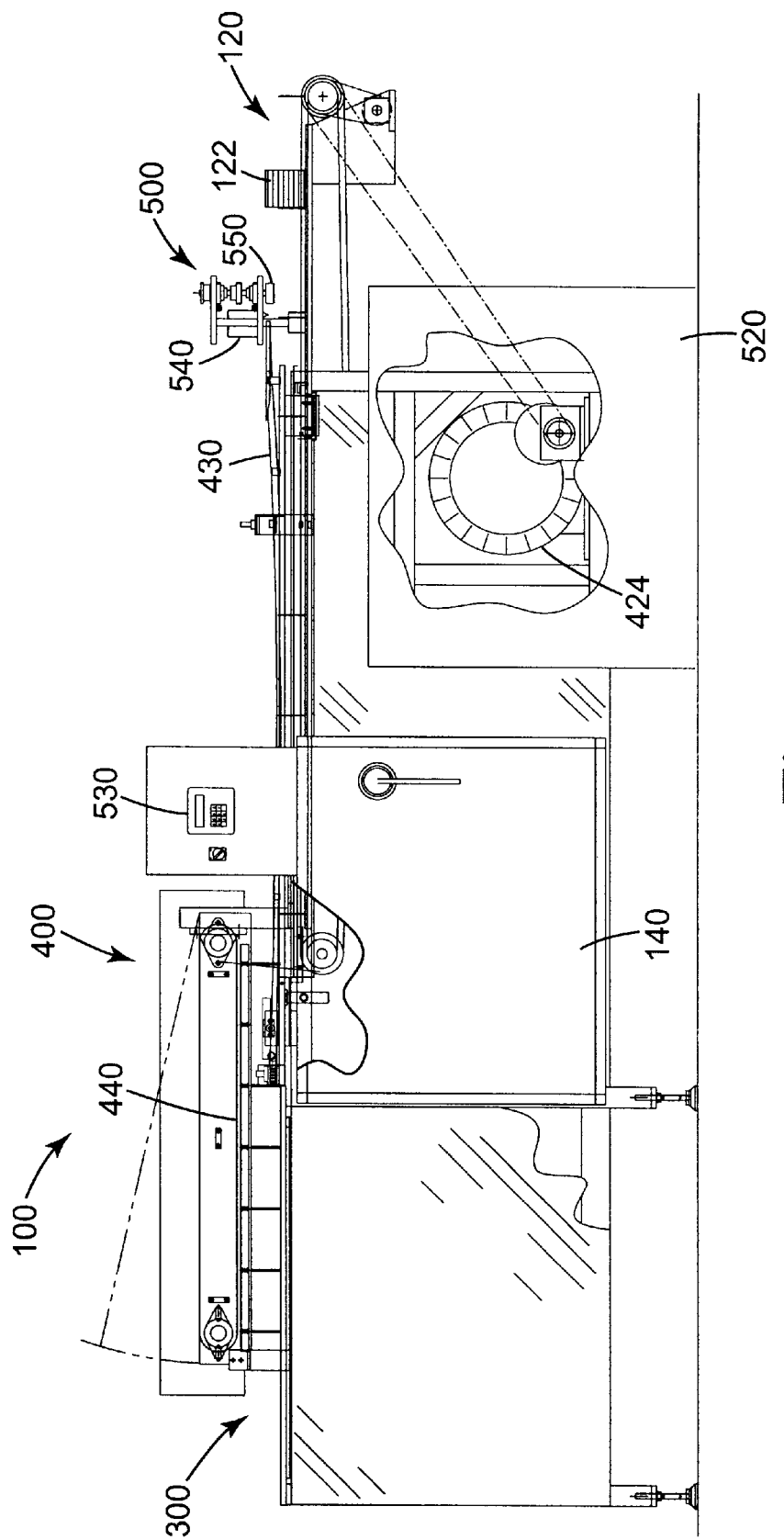
FIG. 5 is an side view of the filter forming and joining apparatus of FIG. 4, without the pleat block feeder shown.

FIGS. 4 and 5 show plan and side views, respectively, of one embodiment of a filter forming and joining apparatus of the present invention as illustrated by the schematic in FIG. 1. The apparatus input 110 are pleat blocks 112 that are loaded into a pleat block feeder 200 at an input end 232. These incoming pleat blocks 112 may be hand loaded, may be automatically loaded from bulk storage, may be the output of an upstream pleat block forming procedure (as described above), or may be loaded by other means known in the industry.

A supply conveyor 210 transports the pleat blocks 112 in a feeder path direction 230 with the pleats 116 of the pleat blocks 112 arranged perpendicular to the feeder path direction 230. Each pleat block 112 pushes on the pleat block 112 ahead of it in a continuous stream forming a stack 212 within the feeder 200. The pleat block feeder 200 includes a compression conveyor 220 that both aligns and compresses the pleat block stack 212 with a relatively constant stack pressure prior to entering the pleat block isolator component 300 of the apparatus 100. Upper and lower compression belts 222 are driven synchronously by a variable AC motor (not shown) to urge the pleats 116 of the pleat blocks 112 together to produce compressed pleat blocks 112 as shown in FIG. 2B. Simultaneously, successive blocks 112 are urged against other previously delivered blocks 112 to produce a compressed pleat block stack 224. The upper and lower conveyor belts 222 of the compression conveyor 220 function as a compliant nip that accommodates the variable height of the pleat blocks 112. The pleat blocks 112 are transported by engaging the tips of the pleats 116. The compliant nature of the upper and lower conveyor belts 222 increases the conveyor's ability to effectively transport the pleat blocks 112 by increasing the surface area potentially in contact with the tips of the pleats 116, and thus in contact with the pleat blocks 112. Also included in the pleat block feeder 200 is an enclosed connection chute 250 that couples the compression conveyor 220 to the pleat block isolator 300. The chute 250 is designed with a releasable cover 254 that may be opened for quick clearance of the chute 250 in the case of jams, misalignment and/or other feeder problems.

Figure 7A:
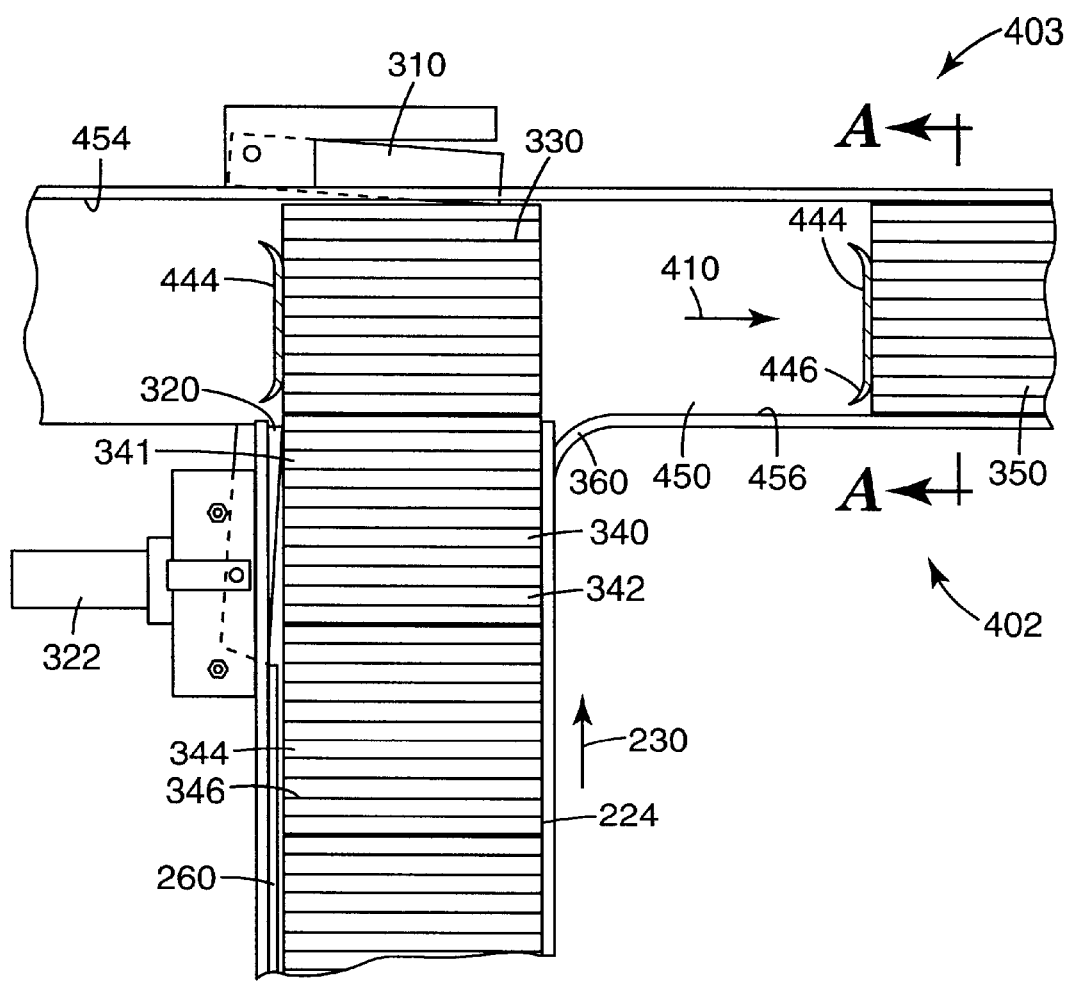
FIG. 7A is a top view of a pleat block isolator useful in performing the steps of FIG. 6.

The pleat block feeder 200 feeds the compressed pleat block stack 224 out of the connection chute 250 along a feeder track 260 in the feeder path direction 230 into the pleat block isolator 300 at the forming end 234 of the feeder 200. The feeder track 260 is adjustable to accommodate variations in block width 117. A detail view of the pleat block isolator is shown in FIG. 7A. The pleat block isolator 300 is designed to transfer each compressed pleat block 112 into the filter former 400, one at a time, in a forming path direction 410 with the pleats 116 of the pleat block 112 parallel to the forming path direction 410, so that each pleat block 112 becomes isolated from all other pleat blocks 112 within the apparatus 100.

The compressed pleat block stack 224 is fed in the feeder path direction 230 within the feeder track 260 until a first pleat block 330 encounters a sidewall 454 of the forming track 450 causing it, and thus the stack 224, to stop its movement in the feeder path direction 230. Although the pleat block feeder 200 and pleat block isolator 300 are shown encountering the filter former 400 at the feeder end 404 perpendicular to the forming path direction 410 from the near side 402 in this embodiment, in alternative embodiments these components may encounter the filter former 400 at the feeder end 404 perpendicular to the forming path direction 410 from the far side 403, or may be arranged in-line, or parallel to, the forming path direction 410 at the feeder end 404.

Figure 6:
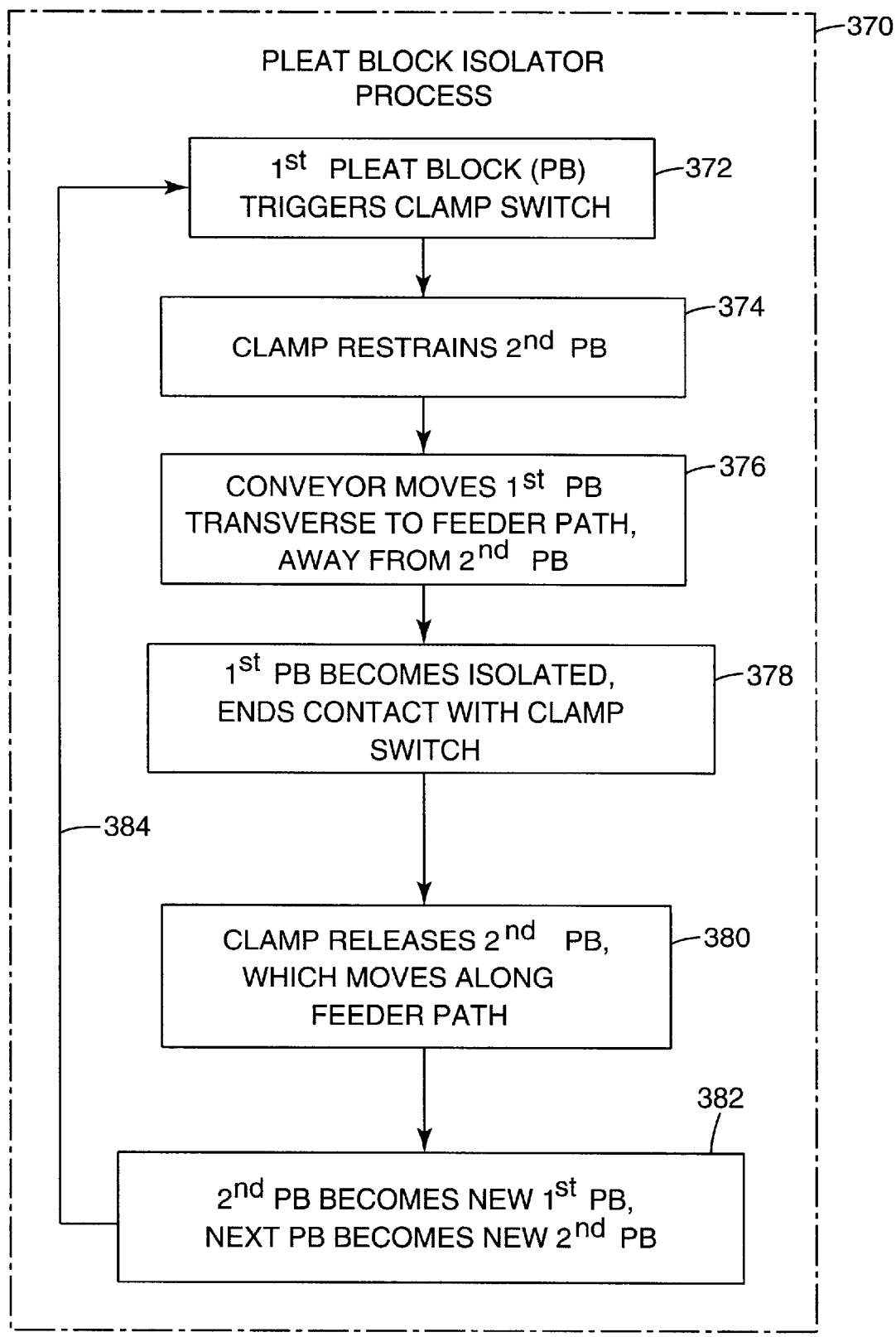
FIG. 6 is a flow chart illustrating the process steps in the operation of a pleat block isolator of the present invention.

The process 370 performed by the pleat block isolator 300 is illustrated in FIG. 6. The process and components of the pleat block isolator will be explained with reference to both FIGS. 6 and 7A. When the first pleat block 330 encounters the sidewall 454 of the forming track 450, it triggers (in step 372) a clamp switch 310 positioned within the sidewall 454. The clamp switch 310 causes a clamp 320, located along the feeder track 260, to restrain (in step 374) a second pleat block 340 within the compressed pleat block stack 224. The clamp 320 may be powered by a pneumatic cylinder 322, or other appropriate mechanism as is known in the art.

Once clamp 320 has restrained the second pleat block 340, a conveyor 440 having paddles 444 spaced apart and attached thereto conveys (in step 376) the first pleat block 330 away from the second pleat block 340 in the forming path direction 410, which, in this embodiment, is transverse to the feeder path direction 230. The direction may differ depending on the configuration and position of the pleat block feeder 200 and pleat block isolator 300. The spaced apart positioning of the conveyor paddles 444 achieves isolation of the pleat block 350 within the filter former 400. At step 378, the conveyed first pleat block 330 ends contact with the clamp switch as it is moved in the forming path direction 410. The second pleat block 340 must be restrained during conveyance of the first pleat block 330 in the forming path direction 410 due to the friction force between the two pleat blocks 330, 340 caused by both the material characteristics, including the coefficient of friction and corrugations, of the pleat blocks 112, and by the compression pressure within the stack 224. Without restraint, the second pleat block 340 would be drawn laterally by the first pleat block 330 to fan out on the clamp side 341 and be pulled around the corner 360 where the feeder track 260 intersects with the forming track 450. As a result, the second pleat block 340 would not remain in a compressed configuration and thus would not be in an appropriate position for the next steps of the process. Therefore, restraining the second pleat block 340 during conveyance of the first pleat block 330 ensures that the second pleat block 340 remains in the correct configuration and position for further processing by the filter forming and joining apparatus 100.

When the first pleat block 330 ends contact with the clamp switch 310, the restraining clamp 320 opens at step 380, releasing the second pleat block 340. The second pleat block is then moved in step 380 in the feeder path direction 230 by the pleat block feeder 200. This second pleat block 340 then becomes (at step 382) the new first pleat block 342 and the next pleat block 344 back along the feeder path direction 230 becomes (at step 382) the new second pleat block 346. The pleat block isolator process 370 then repeats itself, as indicated by line 384, where the new first pleat block 342 contacts and triggers the clamp switch (in step 372), and so on. The process 370 is repeated successively for all of the pleat blocks 112 input into the pleat block feeder 200.

Although use of a pleat block feeder 200 is preferable with the present invention pleat blocks 112 may be input 110 into a pleat block isolator 300 manually, or by other methods known in the industry.

Figure 9:
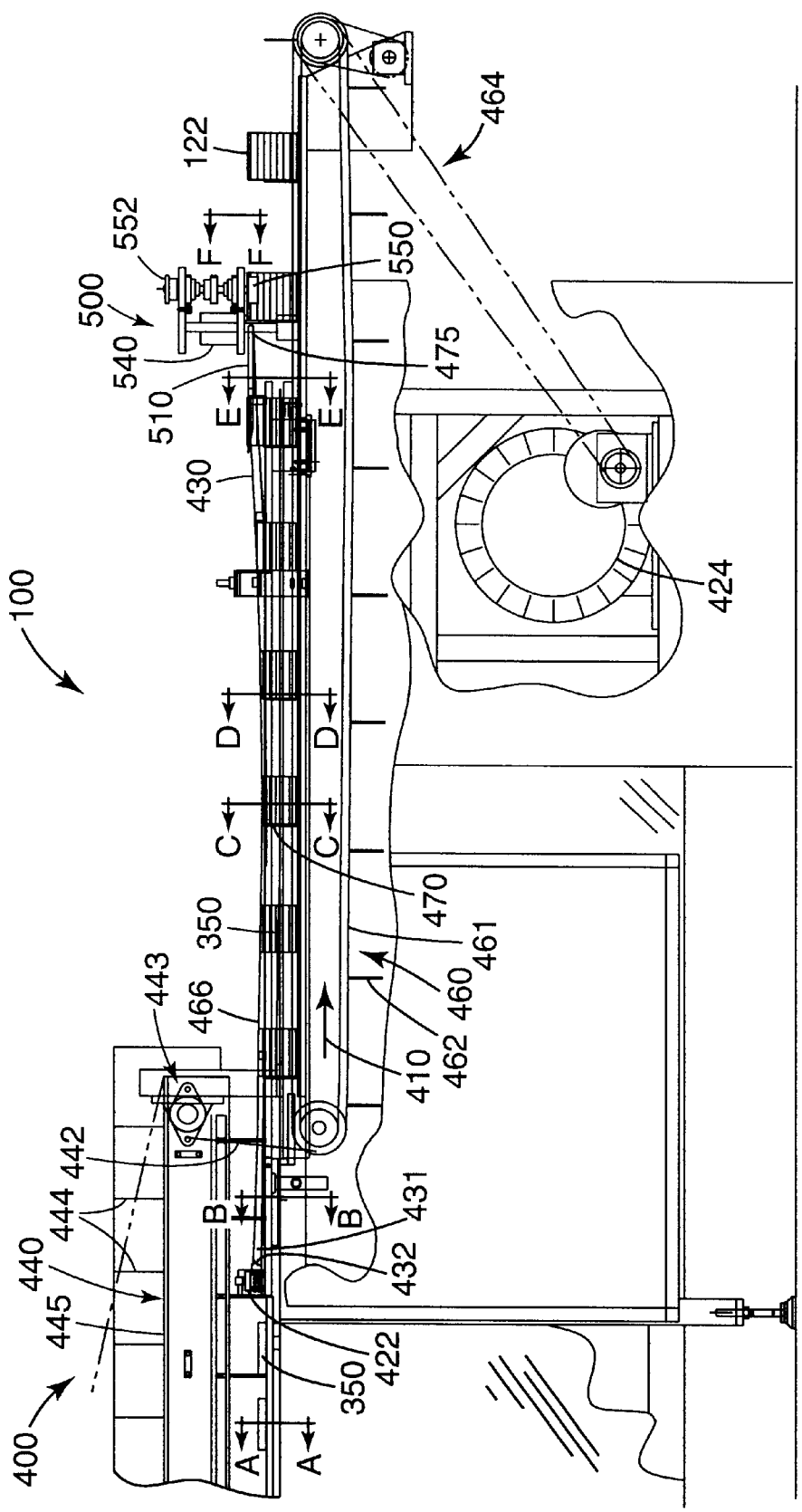
FIG. 9 is an side view providing detail of the filter former and filter joiner elements of the filter forming and joining apparatus shown in FIGS. 4 and 5.

The filter former 400 conveys the isolated, individual pleat blocks 350 continuously in a forming path direction 410, while manipulating them into the desired shape, and into the filter joiner 500. A side view of the filter forming and joining apparatus 100 providing detail on the filter former 400 and filter joiner 500 components is shown in FIG. 9. The isolated pleat block 350 is conveyed along the forming track 450 in the forming path direction 410. The forming track 450 is adjustable to accommodate variations in pleat block compressed width 118. A detail view of the isolated pleat block 350 in this position in shown in FIG. 7B, a cross-sectional end view taken along Line A—A in FIGS. 7A and 9. The isolated pleat block 350 travels on a forming track base 452 in a substantially compressed state between a feeder-side sidewall 454 and a switch-side sidewall 456. The feeder-side sidewall 454 is formed as a smooth bar along which one end pleat 352 of the isolated pleat block 350 runs during conveyance. The switch-side sidewall 456 includes a ledge 458 that provides an inward and downward pressure on the compressed pleat block 350 to discourage the center of the pleat block 350 from buckling out of column by springing upward and out of the forming track 450. An overhang 457 is also included to help keep the isolated pleat block 350 within the forming track 450.

Figure 7B:
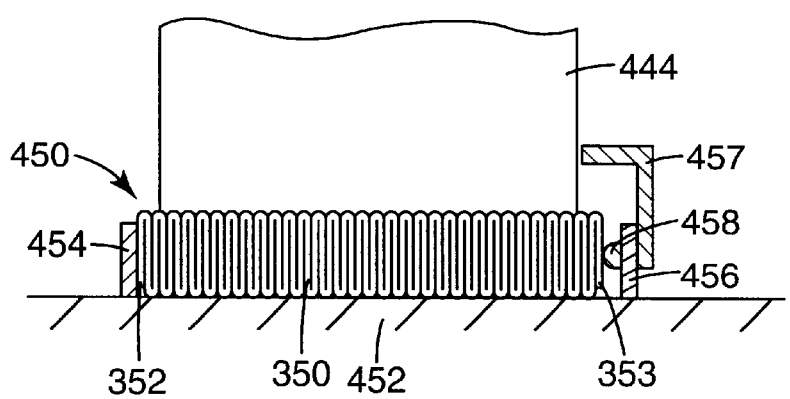
FIG. 7B is a cross-sectional end view of the former track, taken along line A—A in FIG. 7A.

The conveyor 440 that transports the isolated pleat blocks 350 from the pleat block isolator 300 initially in the forming path direction 410 is an overhead chain 445 having spaced apart paddles 444 mounted to it and extending therefrom. However, a molded timing belt with attached paddles, or other suitable conveyor may also be used. The paddles 444 are substantially rectangular in shape, as shown in FIGS. 7B and 8A, and have the lower corners 446 curved away from the forming path direction 410 in order to facilitate smooth conveyance of the pleat blocks 350, as shown in FIG. 7A. The curved corners 446 of the paddles 444, as shown in FIGS. 8A and 8B, angle in from the vertical at about 27°, and up from the horizontal at about 57°. Included on each paddle 444 is a hold down lip 448 to keep the isolated pleat block 350 from buckling upward. An other suitable pleat hold down mechanism is also with the scope of the present invention.

Part way along the forming track 450 the overhead conveyor 440 transfers conveyance of the isolated pleat blocks 350 to a second conveyor 460 which then conveys the pleat blocks 350 through the remainder of the filter former 400 and through the filter joiner 500. This second conveyor 460 also has a chain 461 and spaced apart paddles 462 mounted to it and extending therefrom, but is located under the pleat blocks 350. The lower conveyor 460 is driven by a chain drive 464 and a variable frequency motor (not shown). It is mechanically coupled to the upper conveyor 440 through another chain drive 442. The upper conveyor 440 includes a clutch and brake mechanism 443 to decouple the upper conveyor 440 from the lower driven conveyor 460 in case of jams or other problems within the filter former 400. The upper conveyor 440 is rotatably mounted in order to pivot up and out of the way for easier clean-up and removal of jammed pleat blocks. The upper conveyor 440 is also height adjustable to accommodate variations in pleat height 113.

Figure 10A:
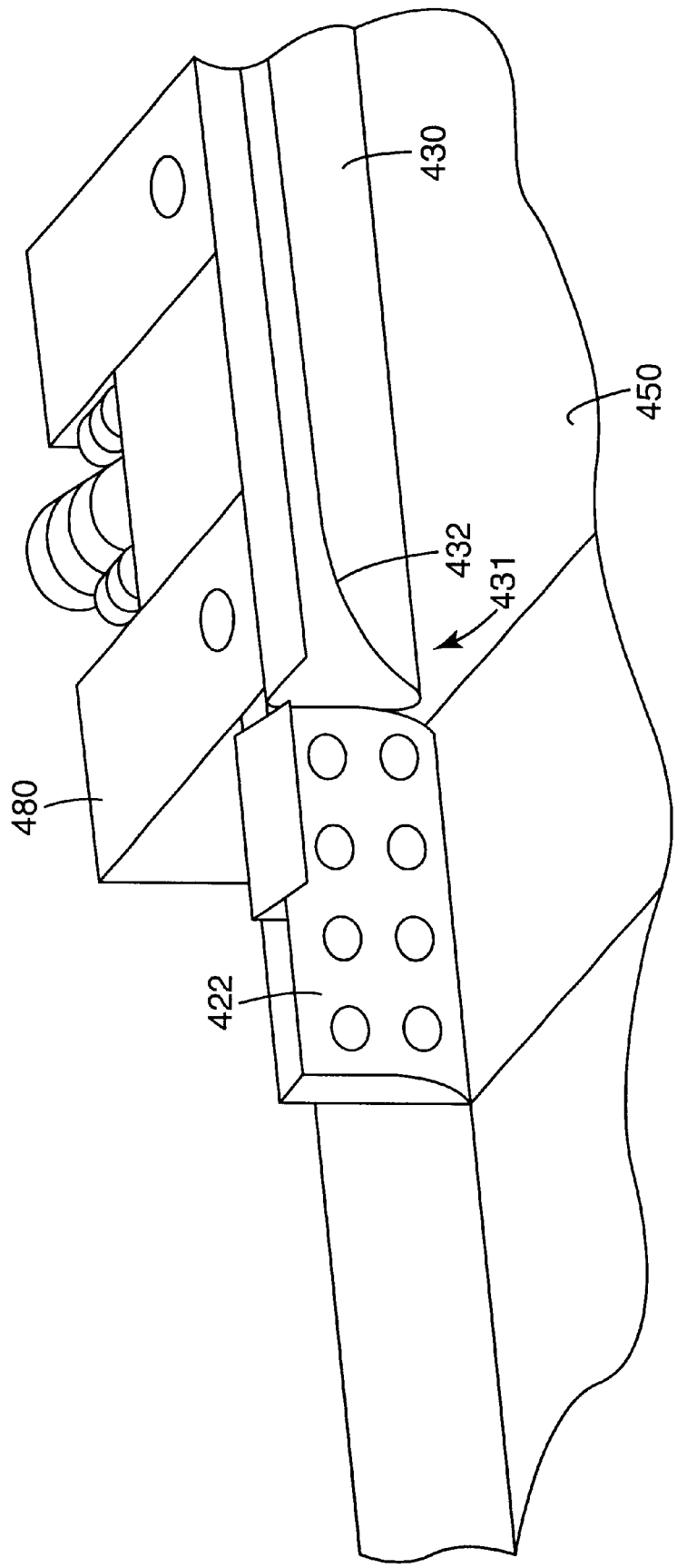
FIG. 10A is a perspective detail view of the entrance end of one side of the forming rails.

The overhead conveyor 440 moves the isolated pleat block 350 in the forming path direction 410 past two vacuum blocks 422, one located within the feeder-side sidewall 454 and one within the switch-side sidewall 456 of the forming track 450, as shown in FIGS. 9 and 10A. A vacuum system 420 having a vacuum blower 424 provides a vacuum to the vacuum blocks 422. The vacuum may also be provided by an appropriately sized external vacuum source, if available, in lieu of a dedicated vacuum system 420. Vacuum sensors (not shown) are provided near the vacuum blocks 422 to verify the presence of the vacuum and shut down the apparatus 100 if vacuum is not present.

Figure 10B:
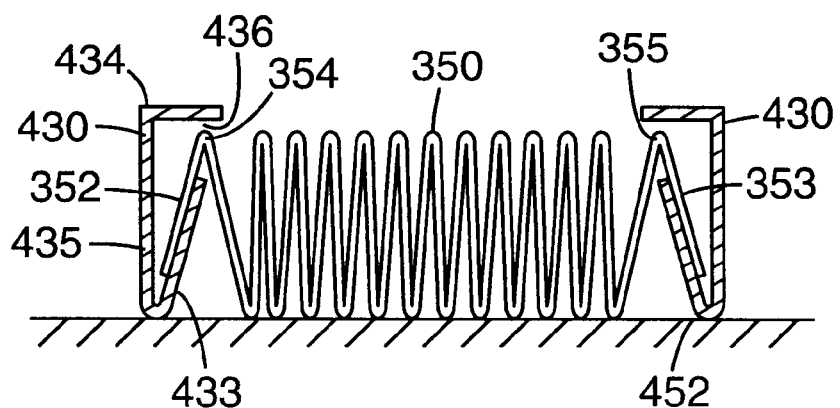
FIG. 10B is a cross-sectional end view of a pleat block received in a starting region of the forming rails, taken along line B—B in FIG. 9.

The vacuum at the vacuum blocks 422 pulls the end pleats 352, 352 away from the body of the pleat block 350. The end pleats 352, 353 then engage radiused knife edges 432 on both sides of the forming track 450 that lead the end pleats 352, 353 into an entrance end 431 of the forming rails 430, which are mounted on either side of the forming track 450. As shown in FIG. 10A, the entrance ends 431 of the forming rails 430 are each attached to an adjustment mechanism 480 that moves each entrance end 431 relative to the vacuum block 422 to accommodate variations in the isolated pleat block 350, such as size or material thickness. The adjustment mechanism 480 is a micrometer mechanism that provides manual movement of the forming rail end 431, however any suitable adjustment mechanism may be used. FIG. 10B shows a cross-sectional end view of an isolated pleat block 350 after the end pleats 352, 353 have entered the forming rails 430. The end pleats 352, 353 remain within the forming rails 430 throughout remainder of the filter former 400 and into the filter joiner 500.

The forming rails 430 are configured in the present embodiment with an inner shorter wall 433 connected to an outer longer wall 435 to form a high "U" shaped channel, and an overhang 434. The difference in height between the two walls 433, 435 leaves a gap 436 through which the joined ends 354, 355 of the end pleats 352, 353, respectively, travel during conveyance in the forming path direction 410. The overhang 434 keeps the end pleats 352, 353 from coming out of the forming rails 430. This configuration is designed to accommodate pleat blocks 350 with end pleats 352, 353 pointing downward. However, the forming rails 430 could be rotated 180 degrees to accommodate end pleats pointing upward (not shown), or one rail could be rotated 180 degrees and one rail remain in position to accommodate one end pleat pointing up and one end pleat pointing downward (not shown).

Figure 11:
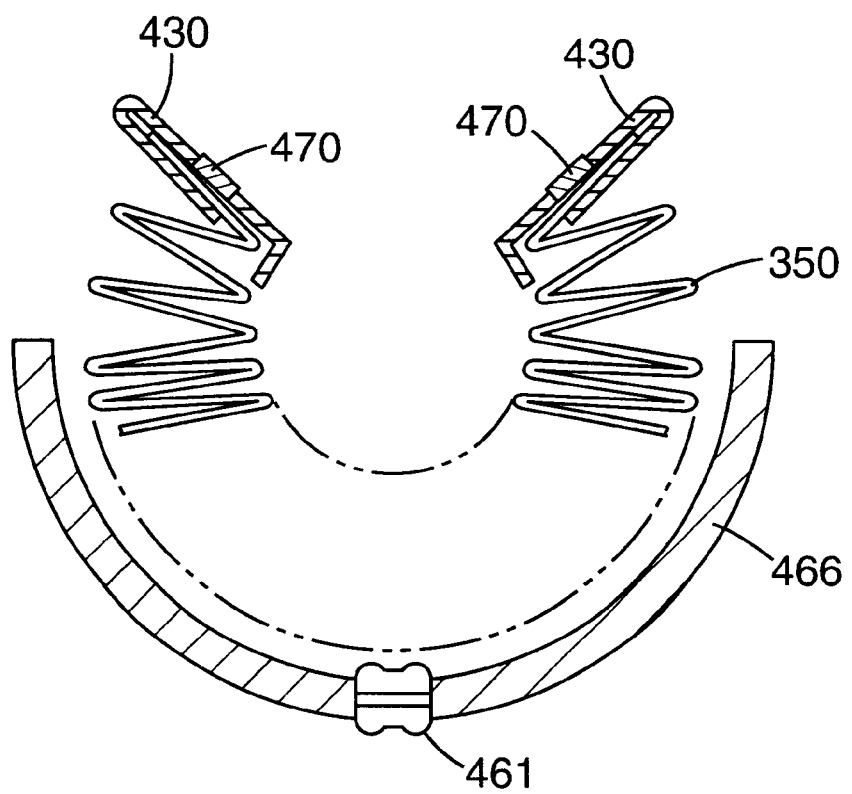
FIG. 11 is a cross-sectional end view of a pleat block traveling along the forming rails, taken along line C—C in FIG. 9.

Once the isolated pleat block 350 has entered the forming rails 430, the upper conveyor 440 interfaces with the lower conveyor 460, transferring conveyance of the pleat block 350. At this point, the forming track 450 ends and a lower conveyor trough 466 begins, along which the a isolated pleat block 350 continues its travels through the apparatus 100. As the pleat block 350 enters the trough 466, the center pleats plunge downward under their own weight creating a concave shape. FIG. 11 shows a cross-sectional end view taken along Line C—C of a pleat block 350 within the trough 466.

Figure 12:
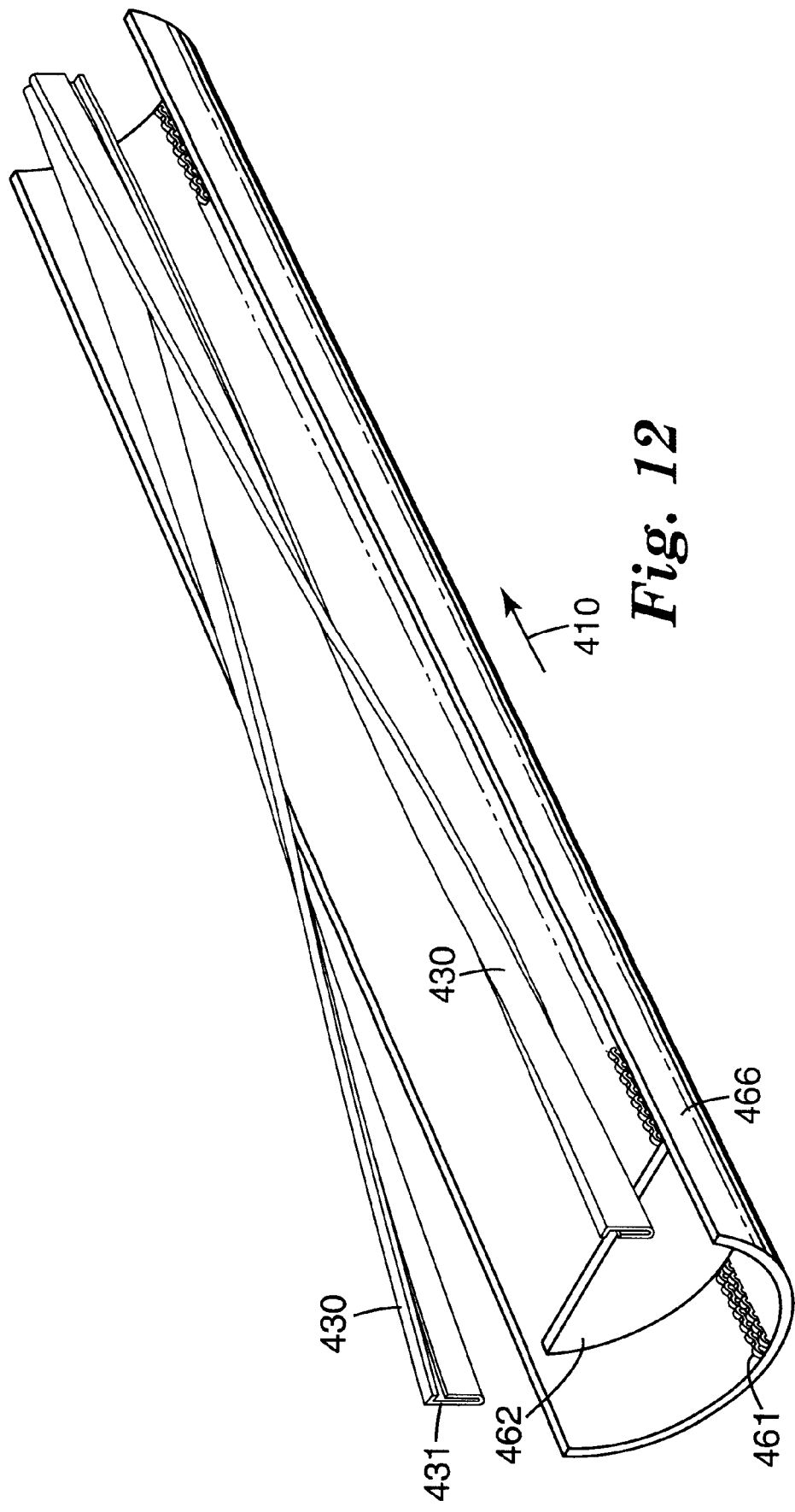
FIG. 12 is a perspective view of the forming rails and forming trough of the filter former shown in FIGS. 4, 5 and 9.
Figure 13:
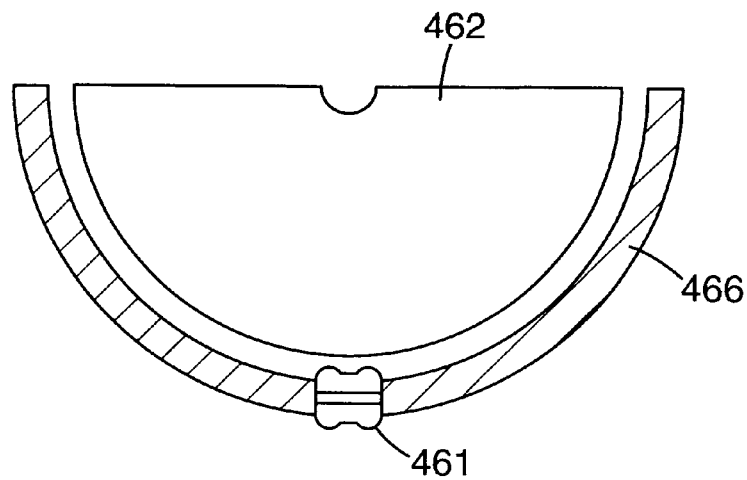
FIG. 13 is a cross-sectional end view of a lower conveyor paddle riding within the forming trough, taken along line D—D in FIG. 9.

The forming rails twist inward 180 degrees, and angle toward each other and slightly upward as they extend in the forming path direction 410. This configuration of the forming rails is illustrated in FIG. 12, with cross-sectional end views shown in FIGS. 11 and 14. The trough 466 extends in the forming path direction 410 underneath the forming rails 430, as shown. The lower conveyor 460 also extends in the forming path direction 410 with the chain 461 located at the base of the trough 466, and the paddles 462 connected to the chain 461 shaped as half-circles to fill the trough cross-section, as shown in FIGS. 12 and 13. At the joiner end 405 of the filter former 400, the forming rails 430 are completely inverted with the longer walls 435 adjacent one another, shown in FIG. 14. As a result, the two end pleats 352, 353 are also adjacent one another, and the isolated pleat block 350 is in the shape of a hollow cylinder.

Along the length of the forming rails 430, a pair of retroreflective photoeye sensors 470 are located to determine whether the end pleats 352, 353 have entered the forming rails 430, as required. The retroreflective photoeye sensors 470 are preferably mounted in the longer walls 435 of the forming rails 430, as shown in FIG. 11, however other types of sensors and other mounting methods are permissible and within the scope of the present invention. In addition, the location of the sensors 470 along the forming rails 430 may vary, being limited only by the beginning and ends of the forming rails 430. Preferably, the sensors 470 are located far enough before the filter joiner 500 to provide adequate sensory input into the filter joiner 500.

Most of the time, the sensors 470 pickup a reflection off of the inside of the shorter wall 433. However, when the isolated pleat block 350 moves past the sensors 470, no reflection is picked up. Control of the sensors 470 is coupled to the movement of the lower conveyor 460 by another sensor, an encoder, or other means, (not shown), such that the position of the isolated pleat block 350 relative to the sensors 470 is known. If a reflection is picked up from either or both sensors 470 when the isolated pleat block 350 is supposed to be passing by the sensors 470, then in all probability the end pleats 352, 353 did not enter the forming rails 430 properly. This information is used by the apparatus 100 to control activity by the filter joiner 500 and by a reject station (not shown), as discussed more below.

Once the isolated pleat block 350 has been reconfigured into a hollow cylinder shape with end pleats 352, 353 adjacent each other, filter formation is complete and the pleat block 350 passes into the filter joiner 500 component of the filter forming and joining apparatus 100. The filter joiner 500 includes an adhesive application system 520, such as, for example, a Meltex model MX4412, 1×1 system, with a pump, hose and gun, however, any appropriate adhesive application system may be used. The filter joiner 500 also includes an embossing system 550, as shown in FIGS. 5 and 9.

Figure 14:
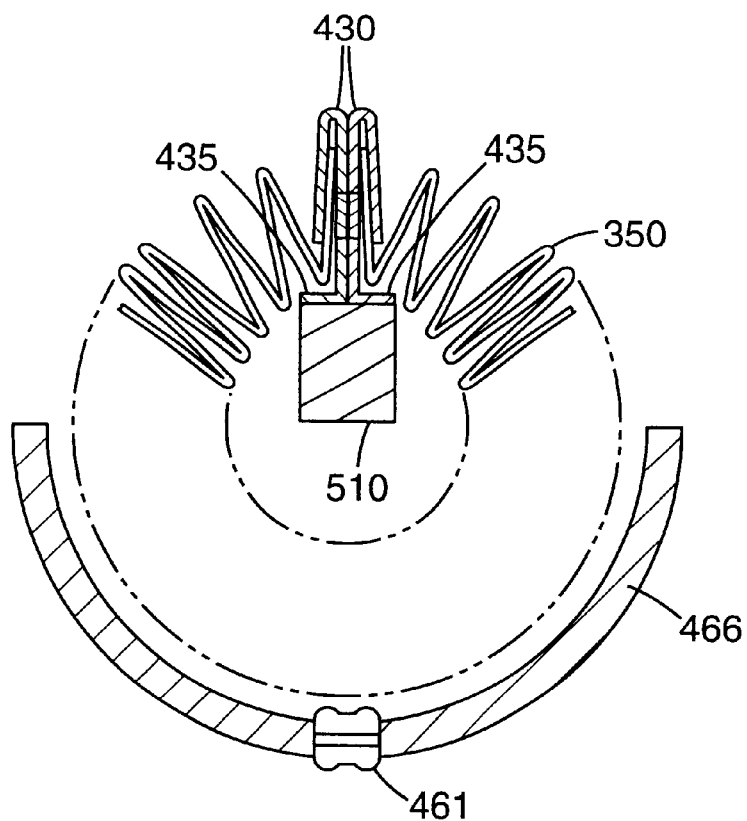
FIG. 14 is a cross-sectional end view of a pleat block traveling along the forming rails at the end of the filter former, taken along line E—E in FIG. 9.

The adjacent end pleats 352, 353, shown in FIG. 14, are conveyed by the lower conveyor 460 out of the forming rails 430. As the end pleats 352, 353 emerge from the forming rails 430, they encounter a pair of registration fingers 580 that push the end pleats 352, 353 against the lower paddle 462 conveying the isolated pleat block 350 along the forming path 410, as shown in FIG. 15A. The registration fingers 580 pivot about points 582 and apply a force against the isolated pleat block 350 created by springs 584. The registration fingers 580 ensure that the end pleats 352, 353 are fully aligned in the longitudinal direction prior to bonding by the filter joiner 500.

In addition, on emergence from the forming rails 430 the isolated pleat block 350 encounters a vertical alignment bar 510, as shown in FIGS. 9, 14, 15A and 16. The end pleats 352, 353 ride on top of the vertical alignment bar 510 so as to keep the end pleats 352, 353 in vertical alignment prior to, and during bonding by the filter joiner 500.

Figure 15B:
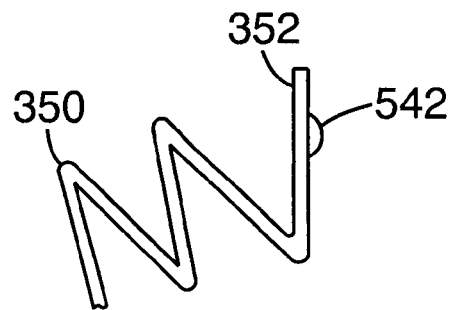
FIG. 15B is a detail view of a formed filter element illustrating an adhesive bead located on one of the end pleat surfaces of the pleat block during filter joining.

Once the end pleats 352, 353 pass through the registration fingers 580, they pass around an adhesive applicator 540 positioned in between the end pleats 352, 353 to place a glue bead 542 along the length of the end pleats 352, 353, as shown in FIG. 15B. The input from an opposed fiber optics photoeye sensor 475 is used by the adhesive application system 520 to control the starting and stopping of the glue bead 542 so as to maximize adhesive application between the end pleats 352, 353 without waste.

The fiber optic sensor 475 is positioned at the adhesive applicator 540 for maximum control over the dispensing of the adhesive. This sensor 475 changes state as the leading and trailing edges of the isolated pleat block 350 enter and exit the adhesive applicator 540, thereby triggering the applicator 540 to apply the glue bead 542 only between the end pleats 352, 353 of the isolated pleat block 350. Although other types of sensors may be used and are within the scope of the present invention, the sensor controlled system, as described, provides greater control over the dispensing of the adhesive than systems that depend upon chain timing or other mechanical attributes.

The adhesive system also includes key-to-line tracking whereby the adhesive applicator 540 automatically adjusts the adhesive flow rate in response to changes in the line speed of the lower conveyor 460. In addition, the output from the retroreflective photoeye sensors 470 is used to prevent the application of any adhesive to isolated pleat blocks 350 for whom one or both end pleats 352, 353 did not enter the forming rails 430 correctly.

Alternatively, the end pleats 352, 353 may be joined by other bonding methods, such as ultrasonic welding, or the like. The bonding method chosen will depend in part on the desired filter output, the filter material input, customer requirements, and other factors.

Figure 16:
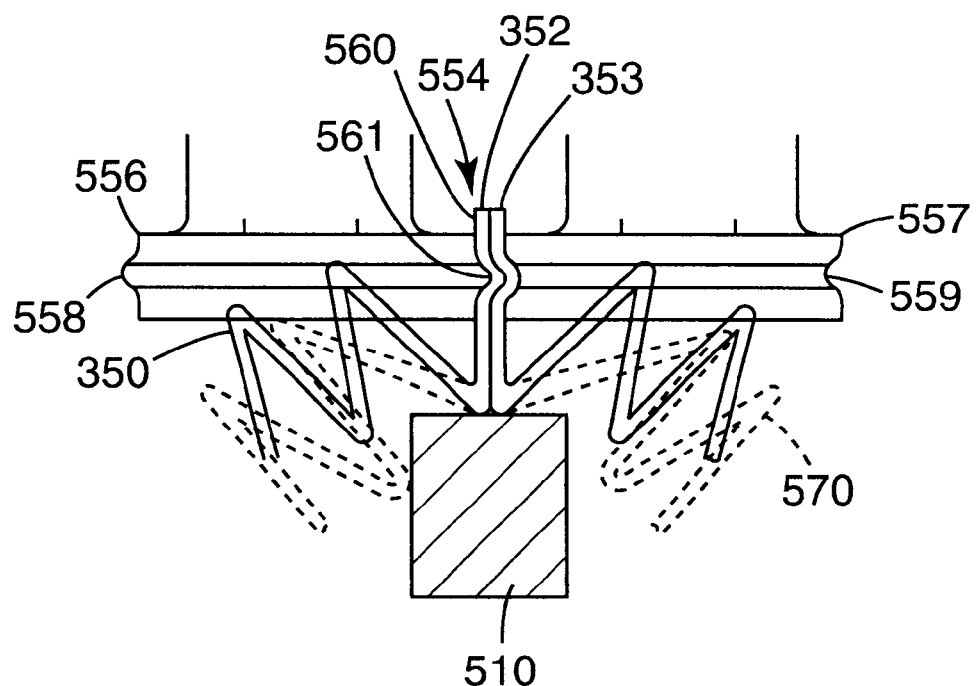
FIG. 16 is a detail view of a formed filter element passing through the creasing wheels of the filter joiner after adhesive application, taken along line F—F of FIG. 9.

After application of the glue bead 542, the end pleats 352, 353 are conveyed into and compressed by a nip 554 formed by two creasing wheels 556, 557, as shown in FIG. 16. The creasing wheels 556, 557 are rotated by a drive mechanism 552. One crease wheel 556 is formed with a protrusion 558 that extends around the perimeter of the wheel 556 at the midline. The other wheel 557 is formed with a corresponding indentation 559 around the perimeter of the wheel 557 at the midline. As a result, the nip 554 formed by the two wheels 556, 557 is a mated nip. When the end pleats 352, 353 with the glue bead 542 therebetween pass through the mated nip 554, the combination of the protrusion 558 and indention 559 not only creates an embossed crease 561 along the length of the end pleats 352, 353, but also provides compression of the pleats 352, 353 allowing the adhesive to flow and cover more surface area. In addition, the nip 554 sets the adhesive, and, in some cases, forces the adhesive into the filter material thereby forming an even stronger bond. These embossed and glued end pleats 352, 353 form a joint 560 that securely fastens the pleat block 350 into a hollow cylinder shape as it emerges from the filter joiner 500. The end result is the output filter element 122, as shown in FIG. 3.

As the isolated pleat block 350 passes through the mated nip 554, the pleats adjacent the end pleats 352, 353 are pushed downward and out of the way. This configuration of the pleat block 570 is shown in phantom in FIG. 16. Once the filter element 122 emerges from the mated nip 554, the adjacent pleats rebound without any permanent deformation. Both the design of the crease wheels 556, 557 and the speed at which the pleat blocks 350 pass through the nip are responsible for maintaining pleat integrity during the joining operations. Alternately, the nip 554 may be formed by a series of wheel pairs, or by a belt combination. The type, size and design of the nip 554 depends in part on the adhesive or other bonding method used, filter material requirements, customer requirements, and the desired finished result.

The lower conveyor 460 continues to convey the finished filter elements 122 out of the filter joiner 500 component. These finished filter elements 122 may then be collected for packaging or storage, or they may be transferred to a subsequent operation for further processing, such as curing, end cap application, insertion into canisters, or other appropriate filter manufacturing processes. In another embodiment, a rejection station (not shown) may be set up whereby unjoined pleat blocks are deposited in one area, and joined filter elements are transferred to another area. The output of the retroreflective photoeye sensors 470, discussed above, would prevent the application of adhesive to an unformed pleat block, and the activation of the rejection mechanism for the block. This rejection station may also be controlled by the adhesive application system 520 so that pleat blocks 350 that issue from the apparatus 100 when the adhesive system 540 is not operating would be automatically collected for scrap or for re-input into the apparatus 100.

Figure 17:
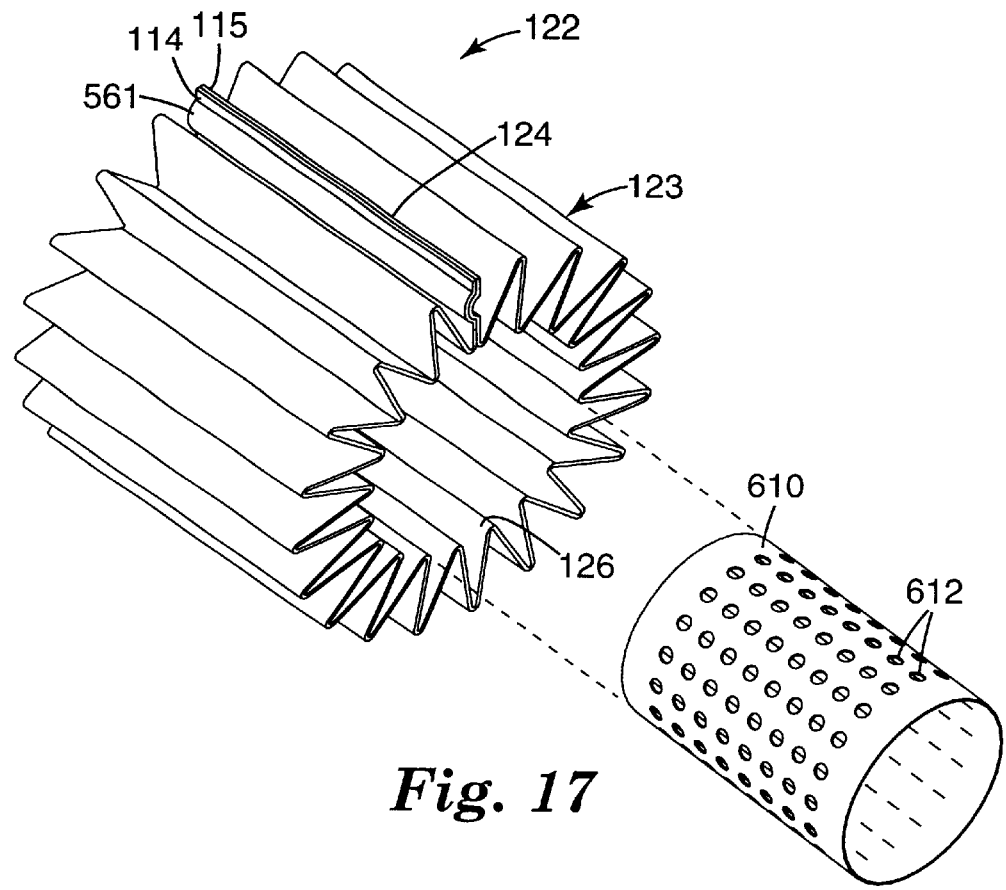
FIG. 17 is a perspective view of the formed filter and a center core.

An alternative embodiment of the filter forming and joining apparatus 100 of the present invention includes a core inserter 600 that interfaces with the filter former 400, as shown in FIG. 1. A core 610 is a hollow cylinder formed primarily from metal that usually includes perforations 612 to allow for fluid flow through the filter element 122, as shown in FIG. 17. The core 610 will usually be the same length as the filter element 122. The traditional method of inserting a core 610 into a hollow cylinder-shaped filter element 122 is to align the core 610 with the center hollow opening 126 of the filter element 122 and slide either the core 610 into the filter element 122, or the filter element 122 onto the core 610. In the present invention, however, a core 610 can be deposited into the isolated pleat block 350 while it is being formed into a filter element 122, and thus eliminate post-filter formation operations to insert the core 610.

Figure 19:
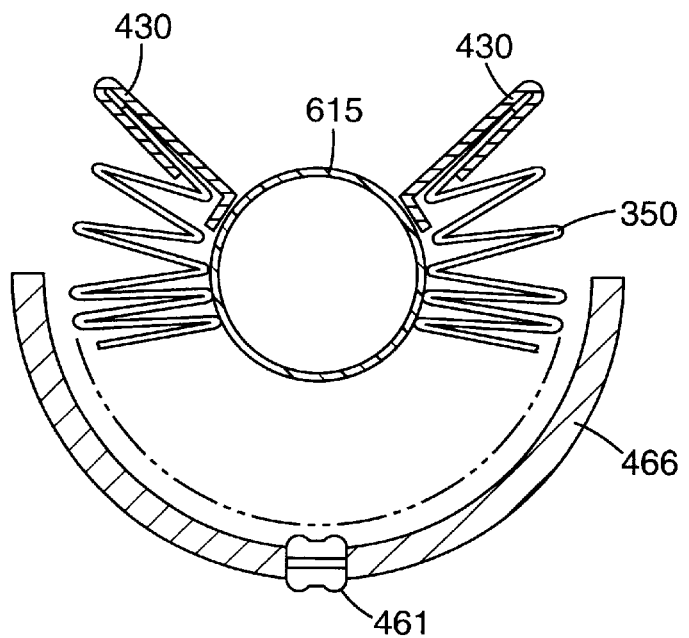
FIG. 19 is a cross-sectional end view of a pleat block traveling along the forming rails with an inserted core.
Figure 18:
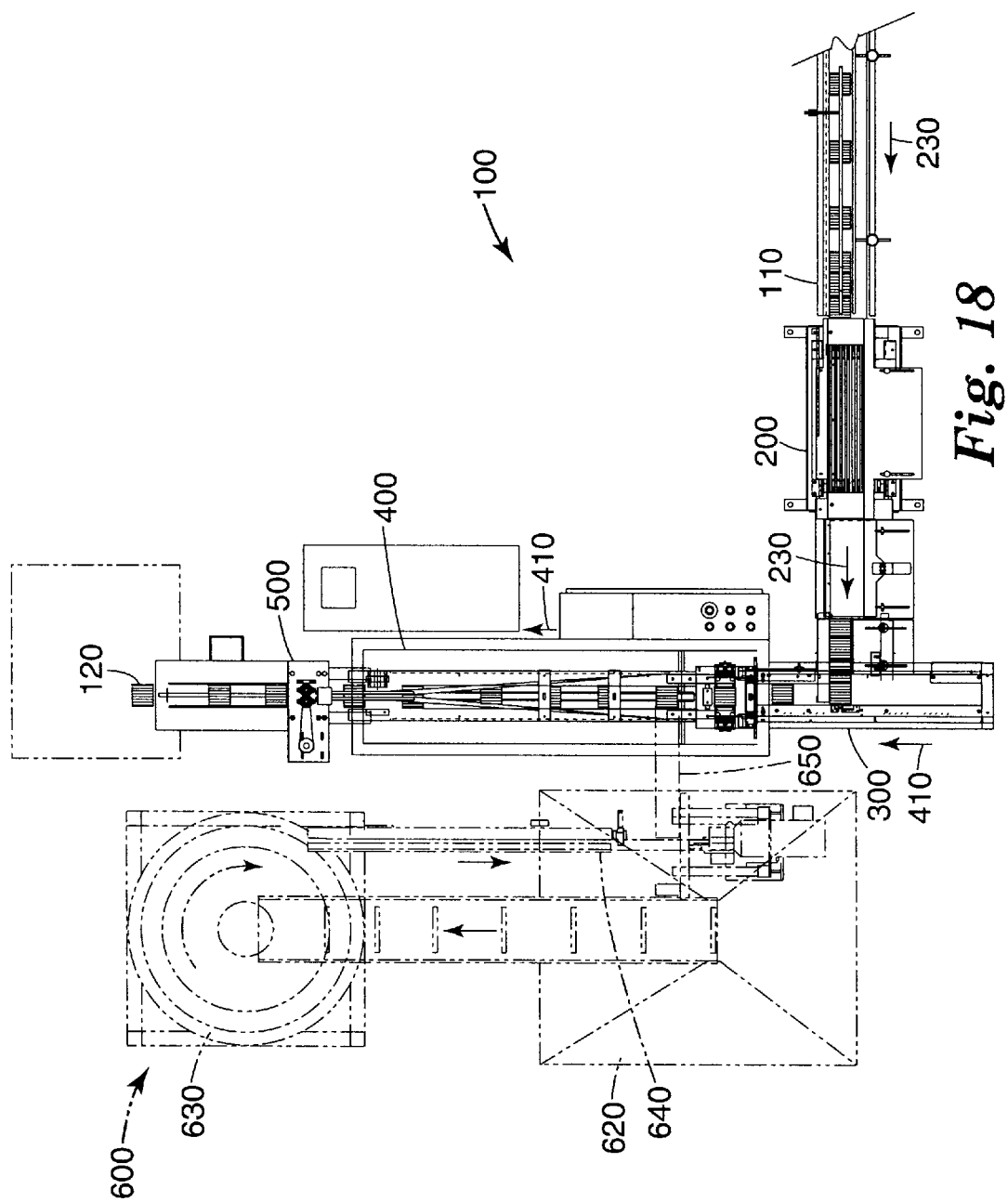
FIG. 18 is a plan view of a filter forming and joining apparatus of the present invention including an optional core inserter.

A filter forming and joining apparatus 100 with an attached core inserter 600 is shown in FIG. 18. A hopper connected to an elevator 620 is loaded with cores 610. The cores 610 are raised from the hopper 620 by the elevator 620 to a centrifugal feeder bowl 630. Aligned cores 610 are output from the feeder bowl 630 along a transfer conveyor 640 and deposited into a core accumulator 650 in readiness for insertion into the isolated pleat blocks 350. The cores 610 are dropped one at a time between the forming rails 430 into the concave pleat block 350 suspended within the trough 466. An inserted core 615 is shown in FIG. 19. The core insertion occurs while the isolated pleat block 350 is conveyed along the forming rails without the need for stops or hesitation in the filter forming and joining process. Once inserted, the pleat block 350 with an inserted core 615 continues through the filter former 400 and the filter joiner 500 in the same manner as a pleat block 350 without an inserted core 615. In this embodiment, the retroreflective photoeye sensors 470 discussed above are preferably located along the forming rails 430 prior to the point of insertion of the core 610.

The filter forming and joining apparatus of the present invention is capable of automatically producing hollow cylinder-shaped metal-free filter elements from pleat blocks of pleated filter material in a cost effective and efficient manner. Automatic machinery for producing metal clipped filter elements is currently capable of forming and joining filter elements at a maximum rate of 40–45 parts per minute. The apparatus of the present invention, however, has demonstrated a capacity of over 60 parts per minute, and has been tested at speeds in excess of 75 parts per minute.

Along with the increase in speed, the apparatus of the present invention provides improved positioning accuracy of the isolated pleat blocks during both forming and joining. Improved positioning in turn improves adhesive application and control, thereby minimizing waste and increasing efficiency. The continuous mechanical operation of the apparatus also has increased reliability due to tighter control over the pleat blocks and the process. In addition, since the continuously operating apparatus incorporates joining of the filter elements, and optionally insertion of cores, into the forming process, the number of machine components decreases and so does the cost of the overall apparatus.

Although the present invention has been described with reference to preferred embodiments, workers skilled in the art will recognize that chances may be made in form and detail without departing from the spirit and scope of the invention. In addition, the invention is not to be taken as limited to all of the details thereof as modifications and variations thereof may be made without departing from the spirit or scope of the invention.

What is claimed is:

1. A method of automatically and continuously forming a succession of metal-free cylindrical filter elements, each from a pleat block of pleated filter material having a first end of the pleat block and a second end of the pleat block, using a filter forming and joining apparatus, the apparatus including a pleat block isolator, a filter former and a filter joiner, the method comprising the steps of:
   a. isolating successive individual pleat blocks from other pleat blocks in a succession of pleat blocks within the pleat block isolator in preparation for filter element formation;
   b. manipulating each isolated pleat block continuously along a forming path into a hollow cylinder shape within the filter former, each isolated pleat block including a first end pleat at the first end of the pleat block and a second end pleat at the second end of the pleat block, by receiving the first end pleat and the second end pleat of each isolated pleat block within a first enclosed forming rail and a second enclosed forming rail, respectively, mounted along the forming path, and guiding the first end pleat and second end pleat into position with a surface of the first end pleat and a surface of the second end pleat adjacent each other when the isolated pleat block is in the hollow cylinder shape by progressively rotating through a 180 degree rotation the first end pleat and the second end pleat while located within the first and second enclosed forming rails, respectively; and
   c. bonding together the surface of the first end pleat and the surface of the second end pleat of each hollow cylinder-shaped isolated pleat block within the filter joiner while continuously moving each hollow cylinder-shaped pleat block along the forming path to produce a metal-free cylindrical filter element.

2. The method of claim 1, wherein the step of isolating successive individual pleat blocks within the pleat block isolator comprises:
   a. triggering a clamp switch with a first pleat block of the succession of pleat blocks;
   b. clamping a second pleat block subsequent and contiguous to the first pleat block in the succession of pleat blocks;
   c. conveying the first pleat block away from the second pleat block along the forming path, the first pleat block becoming isolated from other pleat blocks; and
   d. releasing the clamp on the second pleat block such that the second pleat block and the succession of pleat blocks are free to move.

3. The method of claim 2, wherein the step of isolating repeats for all pleat blocks within the succession of pleat blocks.

4. The method of claim 2, wherein the step of conveying the first pleat block along the forming path occurs in a direction perpendicular to the succession of pleat blocks.

5. The method of claim 1, wherein the step of manipulating each isolated pleat block along a forming path within the filter former comprises conveying the isolated pleat block along at least a portion of the forming path using a first conveyor having spaced apart paddles extending therefrom, the first conveyor being mounted over the forming path.

6. The method of claim 5, wherein the step of manipulating further comprises:
   a. interfacing the first conveyor with a second conveyor having spaced apart paddles extending therefrom, the second conveyor being mounted under the forming path;
   b. transferring conveyance of the isolated pleat block from the first conveyor to the second conveyor; and
   c. conveying the isolated pleat block along the remaining portion of the forming path using the second conveyor.

7. The method of claim 1, wherein the step of manipulating comprises:
   a. inserting the first and second end pleats of the isolated pleat block into, respectively the first and second enclosed forming rails mounted along the forming path for guiding the first and second end pleats into position adjacent each other;
   b. conveying the isolated pleat block along the forming rails; and
   c. producing a hollow cylinder-shaped isolated pleat block having adjacent first and second end pleats.

8. The method of claim 7, wherein the step of manipulating further comprises pulling a vacuum on the first and second end pleats of the isolated pleat block prior to insertion,into the forming rails to facilitate insertion into the forming rails.

9. The method of claim 8, wherein the step of manipulating further comprises adjusting the location of the forming rails relative to the vacuum using an adjustment mechanism to facilitate insertion into the forming rails.

10. The method of claim 7, wherein the step of manipulating further comprises pushing the first and second end pleats into longitudinal alignment using first and second registration fingers prior to the step of bonding.

11. The method of claim 1, wherein the step of bonding together the adjacent first and second end pleats of the isolated pleat block within the filter joiner comprises placing an adhesive between the adjacent first and second end pleats.

12. The method of claim 11, wherein the step of bonding further comprises conveying the adjacent first and second end pleats, with an adhesive in between them, through a nip to compress and strengthen the bond between the adjacent first and second end pleats.

13. The method of claim 12, wherein the step of conveying the adjacent first and second end pleats through a nip comprises conveying the end pleats through a first crease wheel and a second crease wheel that are driven and mated.

14. The method of claim 1, wherein the step of bonding comprises the step of vertically aligning the first and second end pleats of the hollow cylinder-shaped isolated pleat block prior to and during bonding.

15. The method of claim 1, further comprising the step of feeding a succession of pleat blocks from a pleat block feeder that aligns and compresses the succession of pleat blocks in preparation for pleat block isolation.

16. The method of claim 1, wherein the step of manipulating each isolated pleat block comprises the step of inserting a center core into the hollow cylinder-shaped isolated pleat block along the forming path.

17. A method of automatically and continuously forming a succession of cylindrical filter elements, each from a pleat block of pleated filter material, each pleat block having first and second ends and a plurality of pleats directed longitudinally along the pleat block between the first and second ends of the pleat block, using a filter forming and joining apparatus, the apparatus including a pleat block isolator, a filter former and a filter joiner, the method comprising the steps of:

isolating successive individual pleat blocks from other pleat blocks in a succession of pleat blocks within the pleat block isolator in preparation for filter element formation by aligning the succession of pleat blocks upon a plane with the pleats of each individual pleat block oriented perpendicular to a direction of travel of the succession of pleat blocks into the pleat block isolator;

aligning and compressing the pleats in the succession of pleat blocks prior to their entrance into the isolator using a compression conveyer;

smoothly changing direction of travel of each individual pleat upon the plane as each isolated pleat block moves from the pleat block isolator along a forming path in a direction of travel that is perpendicular to the direction of travel of the succession of pleat blocks into the pleat block isolator, and orienting the pleats of each isolated pleat block in the same direction of travel as that of the forming path;

after the step of smoothly changing direction, manipulating each isolated pleat block along the forming path into a hollow cylinder shape within the filter former, the hollow cylinder-shaped isolated pleat block having a first end pleat and a second end pleat positioned adjacent each other; and bonding together the adjacent first end pleat and second end pleat of each hollow cylinder-shaped isolated pleat block within the filter joiner, while continuously moving each hollow cylinder-shaped pleat block along the forming path to produce a cylindrical filter element.

18. The method of claim 17, wherein the step of isolation further comprises triggering a clamping mechanism of the pleat block isolator by a first pleat block of the succession of pleat blocks, the clamping mechanism including a clamp switch and a releasable clamp, and restraining subsequent pleat blocks in the succession of pleat blocks with the releasable clamp when the first pleat block of the succession of pleat blocks contacts the clamp switch, such that the first pleat block becomes isolated from other pleat blocks in the succession of pleat blocks as the first pleat block moves along the forming path.

19. The method of claim 17, wherein the step of manipulating further comprises receiving the first end pleat and the second end pleat of each isolated pleat block within a first enclosed forming rail and a second enclosed forming rail, respectively, mounted along the forming path, and guiding the first end pleat and second end pleat into position with a surface of the first end pleat and a surface of the second end pleat adjacent each other when the isolated pleat block is in the hollow cylinder shape by progressively rotating through a 180 degree rotation the first and second end pleats while located within the first and second enclosed forming rails, respectively.

* * * * *